(12) United States Patent
Gansloser et al.

(10) Patent No.: US 7,399,249 B2
(45) Date of Patent: Jul. 15, 2008

(54) DISK FOR A MULTI-DISK CLUTCH AND PRODUCTION METHOD THEREOF

(75) Inventors: Philip Gansloser, Bad Ditzenbach (DE); Tobias Haerter, Fellbach (DE); Werner Klein, Winnenden (DE); Hartmut Nied, Waiblingen (DE); Rolf Schroeder, Stuttgart (DE); Petra Tennert, Gerlingen (DE)

(73) Assignee: Daimler AG, Stuttgart (DE)

( * ) Notice: Subject to any disclaimer, the term of this patent is extended or adjusted under 35 U.S.C. 154(b) by 252 days.

(21) Appl. No.: 11/337,229

(22) Filed: Jan. 20, 2006

(65) Prior Publication Data

US 2006/0151275 A1    Jul. 13, 2006

Related U.S. Application Data

(63) Continuation-in-part of application No. PCT/EP2004/008001, filed on Jul. 17, 2004.

(30) Foreign Application Priority Data

Jul. 25, 2003    (DE) .................... 103 33 946

(51) Int. Cl.
*F16H 48/20* (2006.01)

(52) U.S. Cl. .................. 475/249; 475/233; 475/248; 192/70.2; 192/54.5

(58) Field of Classification Search ............... 192/70.2, 192/70.21, 70.27, 70.23, 89.22, 207, 54.5, 192/93 A; 475/231, 233, 248, 249; 188/71.5
See application file for complete search history.

(56) References Cited

U.S. PATENT DOCUMENTS

| 1,415,841 | A |   | 5/1922 | Seitz |
|---|---|---|---|---|
| 3,721,794 | A |   | 3/1973 | Jinbo et al. |
| 4,140,030 | A | * | 2/1979 | Williams et al. ............ 74/337 |
| 4,446,955 | A |   | 5/1984 | Lech, Jr. |
| 4,450,943 | A |   | 5/1984 | Long, Jr. |
| 4,890,510 | A | * | 1/1990 | Inui ........................ 475/226 |
| 5,916,054 | A | * | 6/1999 | Kobayashi ................ 475/220 |

FOREIGN PATENT DOCUMENTS

| DE | 1 450 784 | 1/1970 |
|---|---|---|
| DE | 24 59 031 | 6/1976 |
| DE | 32 36 613 | 4/1984 |
| DE | 36 01 903 | 8/1986 |
| EP | 1 058 018 | 12/2000 |
| EP | 1 238 847 | 9/2002 |
| EP | 1 273 473 | 1/2003 |
| FR | 1 492 280 | 7/1966 |

* cited by examiner

*Primary Examiner*—David D. Le
(74) *Attorney, Agent, or Firm*—Klaus J. Bach

(57) ABSTRACT

In a multi-disk clutch comprising a rotary body having splines formed thereon so as to extend helically along the surface thereof, with a number of disks having central openings with inwardly projecting teeth via which the discs are in rotationally positively locking engagement with the rotary body, the teeth are twisted so as to extend in a plane normal to the surface of the helically extending splines of the rotary body so that the end face areas of the teeth are in planar contact with the spline surfaces of the rotary body for the transmission of torque between the rotary body and the disks.

5 Claims, 3 Drawing Sheets

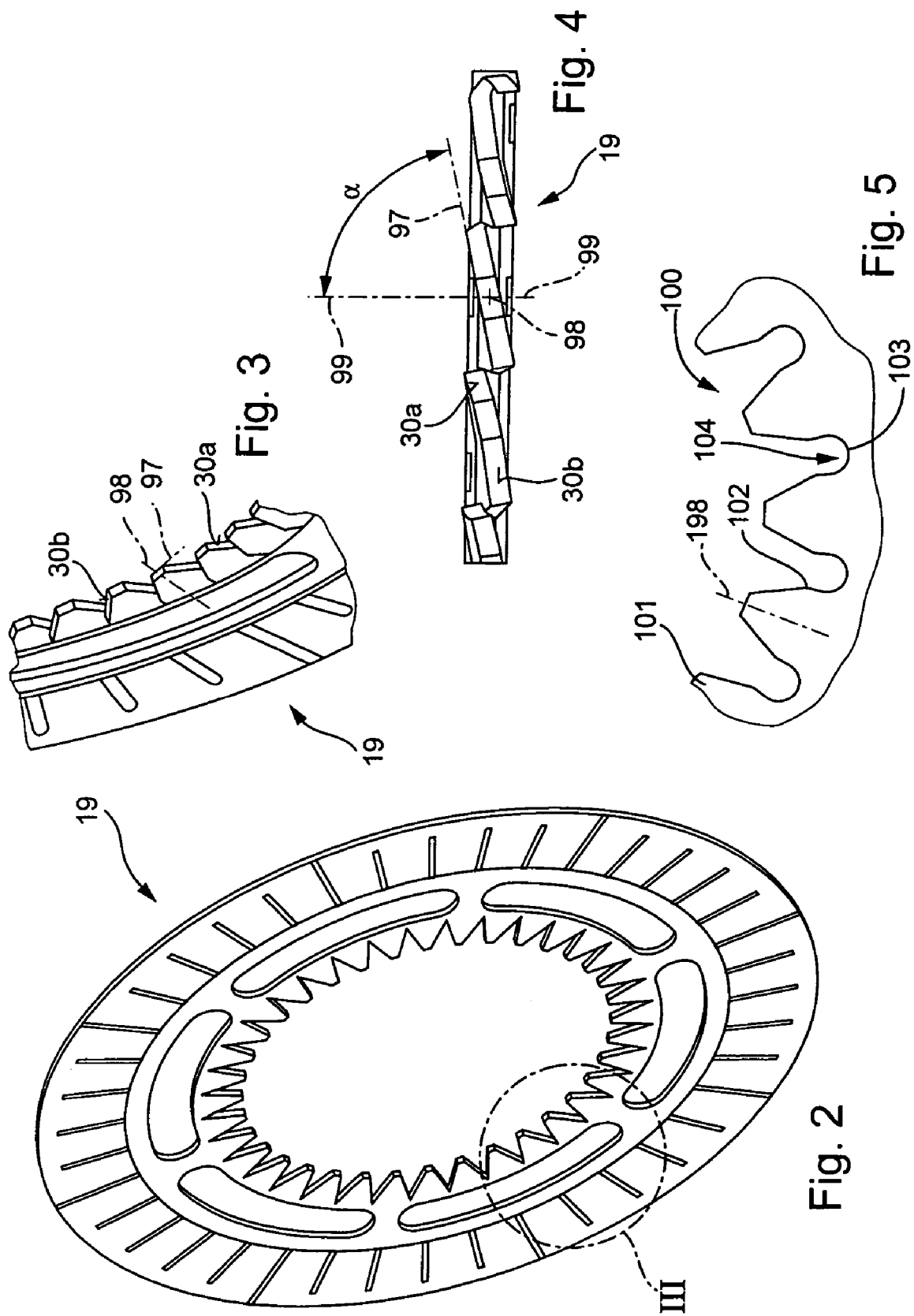

DISK FOR A MULTI-DISK CLUTCH AND PRODUCTION METHOD THEREOF

This is a Continuation-In-Part Application of International Application PCT/EP2004/008001 filed Jul. 17, 2004 and claiming the priority of German Application 103 33 946.9 filed Jul. 25, 2003.

BACKGROUND OF THE INVENTION

The invention relates to a disk of a multi-disk clutch which is axially movably supported on a splined shaft.

The exemplary embodiment in FIG. 4 of EP 1 273 473 A2 already shows an all-wheel drive train having a multi-disk clutch which forms also a torque shock damping element, that is called a Bonanza effect element. The exemplary embodiment in FIG. 6 of the same publication shows a multi-disk clutch which is designed as a transfer clutch.

In mot, Volume 5, dated Feb. 12, 2003, on page 97, a multi-disk clutch is shown in the form of a viscous clutch. In this multi-disk clutch, the disks are provided with teeth on their inner edge, these teeth forming a spline structure providing for a positive-locking rotationally fixed connection to an externally toothed transmission shaft of a motor vehicle.

It is the object of the present invention to provide a clutch disk support arrangement for keeping the rotational play of a multi-disk clutch minimal and to provide a production method for such a multi-disk clutch.

SUMMARY OF THE INVENTION

In a multi-disk clutch comprising a rotary body having splines formed thereon so as to extend helically along the surface thereof, with a number of disks having central openings with inwardly projecting teeth via which the discs are in rotationally positively locking engagement with the rotary body, the teeth are twisted so as to extend in a plane normal to the surface of the helically extending splines of the rotary body whereby the edge face areas of the teeth are in planar contact with the spline surfaces of the rotary body for the transmission of torque between the rotary body and the disks.

In an especially advantageous manner, the disk according to the invention for a multi-disk clutch may be used as a Bonanza effect element in all the sectors in which slipping of the multi-disk clutch at defined torque peaks is desired. By means of such a Bonanza effect element, the components which are connected to the multi-disk clutch can be protected from damage as a result of overloading. When the Bonanza effect element is used in a motor vehicle, the Bonanza effects, which are palpably unpleasant, are kept away from the vehicle occupants. The multi-disk clutch may be designed in particular as a Bonanza effect element according to EP 1 273 473 A2 or as a Bonanza effect element with temperature-dependent slip torque according to EP 1 238 847 A2. The contents of these two applications are to be considered to be included in this application. For a precisely defined slip torque and the operability of a Bonanza effect element, it is important that the rotational play between the disks and the support tooth system of the rotary body which accommodates the disks is small. In the ideal case, there is no rotational play. This rotational play, which arises for technical reasons, depends to a considerable extent on the tooth system play present between the teeth of the disk and the support tooth system on the rotary body. Since the support tooth system in the multi-disk clutch according to the invention is designed as a helical tooth system, line contact of an edge on the helical tooth system would occur in disks which are merely punched out of a sheet of design-related thickness. These edges would be crushed or compressed during torque transmission in the direction of rotation, so that the rotational play tolerance would be increased as a result of permanent plastic deformations. However, for the precisely defined functioning of the Bonanza effect element it is essential that the rotational play is within the tolerance limits. This adverse effect is doubled if the Bonanza effect element transmits a torque in both directions of rotation, whereby the edges of the teeth on the disks are worn on both sides. In this case, the Bonanza effect element may even completely fail to operate.

According to the invention, in an especially advantageous manner, the teeth are in planar contact with the helical tooth structure of the rotary body. The torque to be transmitted is thus distributed over a larger area, so that the stress both in the material of the disk and in the material of the helically toothed rotary body is relatively small. In this case, all conceivable shapes which permit planar contact are possible. Especially advantageous here is the twisting of the teeth of the disks. However, it is likewise possible to cut the teeth obliquely. Since the stress in the material is slight as a result of the planar contact, no plastic deformations occur in particular in the disks. Consequently, the tooth system play also remains constant after an elastic recovery, and the functionality of the Bonanza effect element is fully ensured in addition to the advantages of the helical tooth system.

The planar contact between the teeth and the helical tooth system is effected in particular over the entire tooth width. In this case, it is not necessary for the entire tooth flank of the teeth to be in contact with the helical tooth system. It is sufficient for a section of the tooth flank to be in planar contact—in particular over the entire tooth width—with the helical tooth system. However, the planar contact of the entire tooth flank results in the advantage of especially low stresses in the material of the disk.

In an especially advantageous manner, stresses in the tooth root of the disk can be prevented by recesses being provided there. It is necessary to find an optimum for the radius of the recess. In this case, the angle of twist of the teeth from the tooth tip to the tooth root may change uniformly or non-uniformly.

In an especially advantageous manner, the Bonanza effect element according to EP 1 273 473 A2 can be used in an all-wheel drive train. In this case, the task of the Bonanza effect element is to prevent Bonanza effects during the push-pull changeover and during the pull-push changeover. In an especially advantageous configuration of the invention, the teeth of the disks of the Bonanza effect element engage in a rotationally fixed manner in a running tooth system of the rotary body. This tooth system then meshes with another gear, for example for transmitting the drive torque in the all-wheel drive train. Since the running tooth system is designed according to the invention as a helical tooth system, this is accompanied by the following advantages typical of a helical tooth system for the tooth system pair involved:

high bearing capacity and circumferential velocity on account of uniform transmission under load, and smooth running.

As a result of the use of the running tooth system for accommodating the teeth of the disks, no separate locating tooth system is required for the latter, so that production and cost advantages are obtained.

When used in the all-wheel drive train, the disk or multi-disk clutch according to the invention need not necessarily be used as a Bonanza effect element, but rather may also be designed as a controllable transfer clutch according to FIG. 6 of EP 1 273 473 A2.

Furthermore, the multi-disk clutch may be designed as a central differential lock of a central differential of an all-wheel drive train. Such a central differential lock of a central differential connects two planet members of a three-member epicyclic transmission in order to obtain a rigid through-drive between front axle and rear axle, for example during off-road use or on slippery ground. In an especially advantageous manner, the load distribution to the front axle and the rear axle can be infinitely adjustable in the case of such a central differential lock. To this end, the drive torque transmitted frictionally in the multi-disk clutch between the two planet members is infinitely varied by the contact pressure of the disks. In an especially advantageous manner, such an infinitely adjustable central differential lock can assume a double function and be additionally designed as a Bonanza effect element.

As a result of the helical tooth system, depending on the direction of rotation, axial forces are exerted on the disks in the one or the other axial direction. For example, if the multi-disk clutch is pressed elastically by means of a Belleville spring from the one axial side against a fixed abutment on the other axial side, the direction of rotation produces different pressure forces between the disks of the multi-disk clutch. Depending on the design of the elastic pressure means, the maximum torque that can be transmitted by the multi-disk clutch can therefore be arranged as a function of the direction of rotation. For the application of a Bonanza effect element, this means that, during the push-pull change, the multi-disk clutch slips at a different magnitude of the Bonanza effect than during the pull-push change. However, if the elastic means on the one axial side is designed to be extremely stiff, i.e. virtually rigid, the characteristic of the multi-disk clutch is virtually the same for both directions of rotation.

In a method for manufacturing a disk according to the invention, the teeth of the disk are bent in such a way that they can be placed in planar contact with the teeth of a helical tooth system of the rotary body assigned to this disk. The bending in this case is preferably effected about the tooth center axis. In relation to other production methods, bending is a very cost-effective method, in which, advantageously, no material has to be removed.

In especially advantageous configurations of the production method, the elastic recovery after the plastic deformation of a material is taken into account in the production process.

The invention will become more readily apparent from the following description of an exemplary embodiment which is used in an all-wheel drive train on the basis of the accompanying drawings.

BRIEF DESCRIPTION OF THE DRAWINGS

FIG. 2 shows a disk which is used in the multi-disk clutch, FIG. 3 shows a detail III from FIG. 2, FIG. 4 shows a view of the toothed inner edge of the disk, FIG. 5 shows a detail of an alternative configuration of the tooth system of the disk with reference to an internally toothed disk.

DETAILED DESCRIPTION OF THE INVENTION

Figure 1:
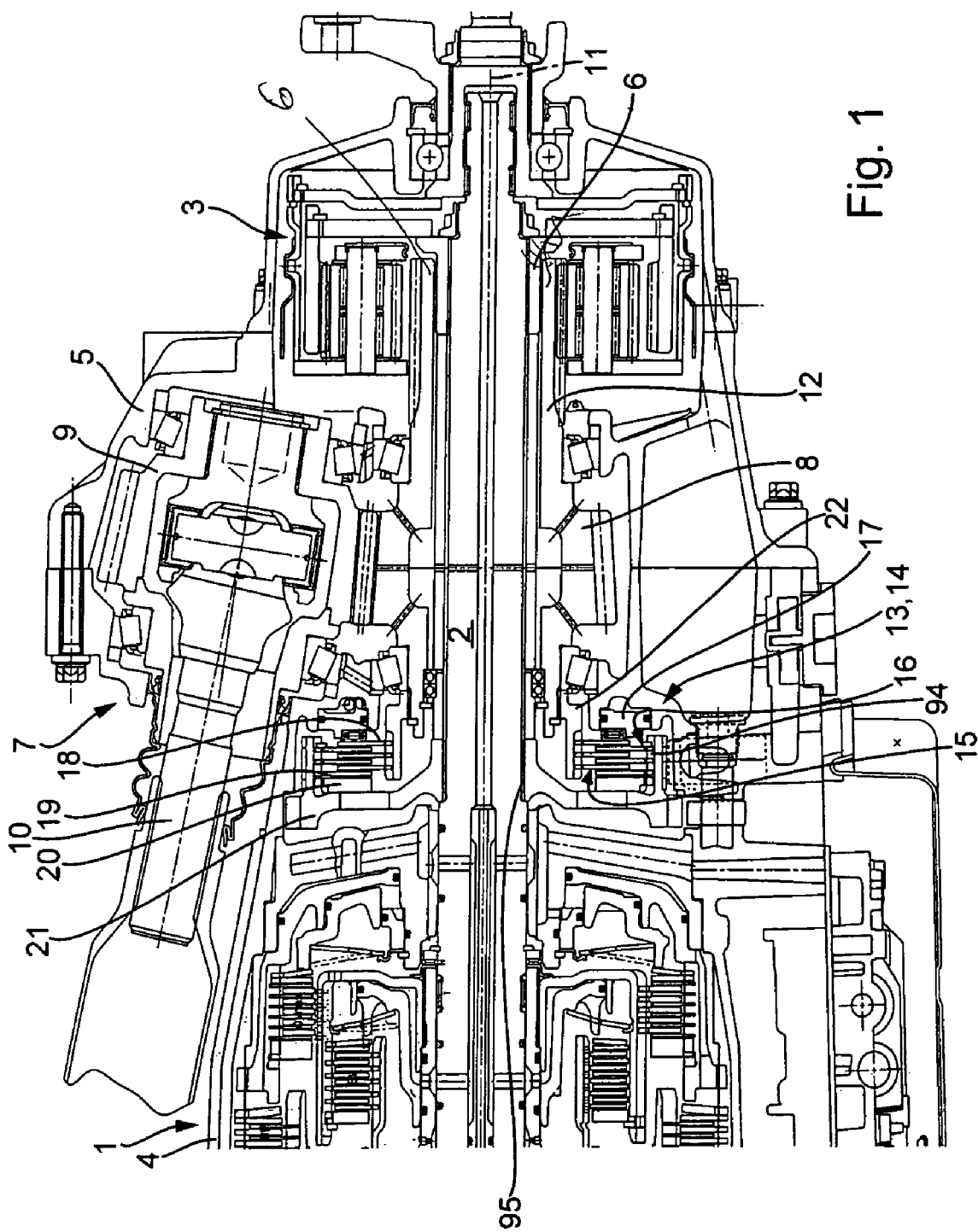
FIG. 1 shows an all-wheel drive train with a central differential lock which has a multi-disk clutch.

FIG. 1 shows part of a longitudinally installed all-wheel drive train for a motor vehicle. In addition to the automatic transmission 1, the all-wheel drive train has a transmission output shaft 2 pointing toward the rear of the motor vehicle in the installed state. This transmission output shaft 2 forms the input shaft 6 of the central differential 3.

The automatic transmission 1 has a transmission housing 4 with an integrally formed bearing housing 5 for a lateral output 7, so that the automatic transmission 1 can be used cost-effectively according to the "add-on principle" for an all-wheel drive vehicle.

In such a variant, the transmission output shaft 2 or input shaft 6 for the lateral output 7 is connected via the central differential 3 and a rear-drive cardan shaft to a pinion shaft of a rear-axle transmission (not shown) in such a way that a first portion of the drive torque is transmitted to the rear-axle transmission. A second portion of the drive torque is transmitted to a front axle by the input shaft 6 via the central differential 3, the drive pinion 8, an output pinion 9, a cardan shaft 10 of the lateral output 7, and a bevel pinion shaft of a front-axle transmission (not shown).

By means of the central differential 3, output torques can be distributed to the front-axle transmission and the rear-axle transmission and speed differences can be compensated for.

The cardan shaft 10 of the lateral output 7 is swivelled horizontally by an angle of about 8° relative to the drive-train longitudinal axis 11. The cardan shaft 10 of the lateral output 7 is swivelled vertically by an angle of about 4° relative to the drive-train longitudinal axis 11.

The lateral output 7 is formed by two gears, to be precise by the drive pinion 8 and the output pinion 9 meshing with the latter. The drive pinion 8 is connected in a rotationally fixed manner to a hollow shaft 12 which is designed in one piece with a sun gear of the central differential 3. The transmission output shaft 2 and the input shaft 6 extend inside this hollow shaft 12. The output pinion 9 is in principle a hollow, externally toothed shaft which is mounted by means of a set of tapered roller bearings in an x arrangement, that is, centrally in the bearing housing 5.

To provide for the horizontal angle and the vertical angle (not shown in any more detail), the cardan shaft 10 is arranged in an articulated manner radially inside the output pinion 9 by means of a universal joint. Furthermore, in the direction of travel at the front, i.e. at its other end, the cardan shaft 10 is coupled in an articulated manner by means of a further universal joint to the bevel pinion shaft of the front-axle transmission.

In the all-wheel drive train, the drive pinion 8 and the output pinion 9 meshing with it are each designed as a straight bevel gear. The cardan shaft 10 is arranged on the right side of the driving engine (not shown) in the direction of vehicle travel.

Furthermore, the all-wheel drive train has a controllable differential lock 13 for the central differential 3, this differential lock 13 being additionally designed as a Bonanza effect element or limited slip clutch. The differential lock 13 is arranged directly adjacent to the automatic transmission 1 between the latter and the drive pinion 8.

The differential lock 13 comprises a multi-disk clutch 14, by means of which the hollow shaft 12 or
the sun gear of the central differential 3 or
the drive pinion 8 can be coupled frictionally in a rotationally fixed manner or in a friction-torque-transmitting manner to the transmission output shaft 2 or
the input shaft 6 or
the ring gear of the central differential 3.

To control the transmitted friction torque between two clutch halves 15, 16 of the differential lock 13, the two clutch halves 15, 16 can be pressed axially against one another by means of an annular regulating piston 17. In this case, the control piston 17 is supported axially on one side on the transmission housing 4 and on the other side via an axial rolling-contact bearing on a disk 18 of the first clutch half 15. Axially following this disk 18 in an alternating manner in the direction pointing forward are the other disks of the two clutch halves 15, 16, an abutment disk 20 adjoining the last disk 19 of the second clutch half 16, this abutment disk 20 bearing axially against a support pot 21, which is connected to the transmission output shaft 2 in a rotationally fixed manner by means of a splined-shaft tooth system. This support pot is a rotary body 21 which is supported in the direction pointing axially forward on a step of the transmission output shaft 2, so that all the disks of the differential lock 13 are restrained in the force flow between the transmission housing 4 and the transmission output shaft 2 when the control piston 17 is disengaged. In addition to the splined-shaft internal tooth system 95 for the rotationally fixed connection to the transmission input shaft 2, the support pot 21 has an internal tooth system 94 for the rotationally fixed and axially displaceable connection to the disks of the second clutch half 16. To this end, the disks of the second clutch half 16, at their outer edge region, have an external tooth system which engages in the internal tooth system of the support pot 21. The internal tooth system of the support pot 21 is designed as a helical tooth system. The teeth of the external tooth system of the disks of the second coupling half 16 are in planar contact with this helical tooth system. To this end, the teeth of these disks are twisted by an angle of 77.7° about their tooth center axis like those of the disk which can be seen from FIG. 4.

At the internal edge region, the disks of the first clutch half 15 have an internal tooth system which transmits the torque in a positive-locking manner to an externally helically toothed socket 22 which is arranged on the front end of the hollow shaft 12 in a rotationally fixed manner by means of a splined-shaft tooth system. The socket 22 forms a rotary body and is supported on the one side at the front end of the transmission output shaft 2 on an axial locking ring. On the other side, the socket 22 is supported on a bearing inner ring of the tapered roller bearing which carries the drive pinion 8. The external tooth system of the socket 22 is designed as a helical tooth system. The teeth of the internal tooth system of the disks of the first clutch half 15 are in planar contact with this helical tooth system. To this end, the teeth are designed in such a way as can be seen from FIGS. 2 to 4.

FIG. 2 shows the one disk 19 as an example of the disks of the first clutch half 15, which are designed identically to one another. Provided radially along the circumference of the disk 19 is the annular friction surface on both sides, which has oil-guide grooves. In a radially central region, the disk has circumferentially curved elongated holes. The internal tooth system is arranged on the inner edge region, the teeth being twisted as shown in FIG. 3.

FIG. 3 shows a detail of the disk. FIG. 4 shows a view of the teeth of the internal tooth system from the drive-train longitudinal axis 11 or the rotation axis 99 congruent with the latter. The teeth in this case are twisted about a tooth center axis 98, so that an angle $\alpha=77.7°$ is defined between the rotation axis 99 and a tangent 97 at the side edge of the tooth tip. As a result, the tooth flanks 30a, 30b are in planar contact with the tooth flanks of the externally helically toothed socket 22. Consequently, the helical tooth system of the socket 22 has an angle corresponding to $\alpha$, so that the tooth flanks 30a, 30b of the teeth of the disk 19 extend parallel to the tooth flanks of the helical tooth system of the socket 22.

The disks of the second clutch half 16 are correspondingly adapted and designed in a similar manner to the first clutch half. An important difference is merely that the teeth lie on the outer edge of the disk. In particular, the twisting of the teeth of the external tooth system of the disks of the second clutch half corresponds to the twisting of the internal tooth system of the disk 19.

FIG. 5 shows a detail of an alternative configuration of the tooth system of the disk with reference to an internally toothed disk 100. In this case, a rounded recess 104 is provided in the tooth root between each two teeth 101. Here, each of the teeth is twisted by said 77.7° about the tooth center axis 198 down to a step 102, from which the recess 104 extends. The angle of twist then decreases continuously from this point, so that there is no longer any twist in the root 103 of the recess 104. That is to say the surface of the radially outer annular region of the disk 100 lies perpendicularly or at 90° to the rotation axis. In the fitted state, only the tooth flank down to the step 102 is in contact with the external tooth system of a helically toothed shaft or the socket 22 according to the first exemplary embodiment. The high stresses during torque transmission during operation of the disk are slowly reduced over the radial length of the recess 104, so that stress cracks cannot easily occur in the tooth root.

The multi-disk clutch of the exemplary embodiment according to FIG. 1 is additionally designed as a Bonanza effect element. Such a Bonanza effect element dampens Bonanza effects during pull-push changes and push-pull changes, as is already described in DE 101 11 257.2. Owing to the fact that the contact pressure of the clutch halves 15, 16 against one another can be freely set by means of the regulating piston 17, the slip torque of the Bonanza effect element is also freely selectable. For example, the slip torque can be set according to whether the vehicle driver has depressed a button "off-road" or "winter". Likewise, the slip torque can be set as a function of the vehicle speed, the current transmission ratio or according to whether the vehicle senses a roadway wetted by rain. In particular, an infinitely variable setting of the slip torque is possible.

Figure 6:
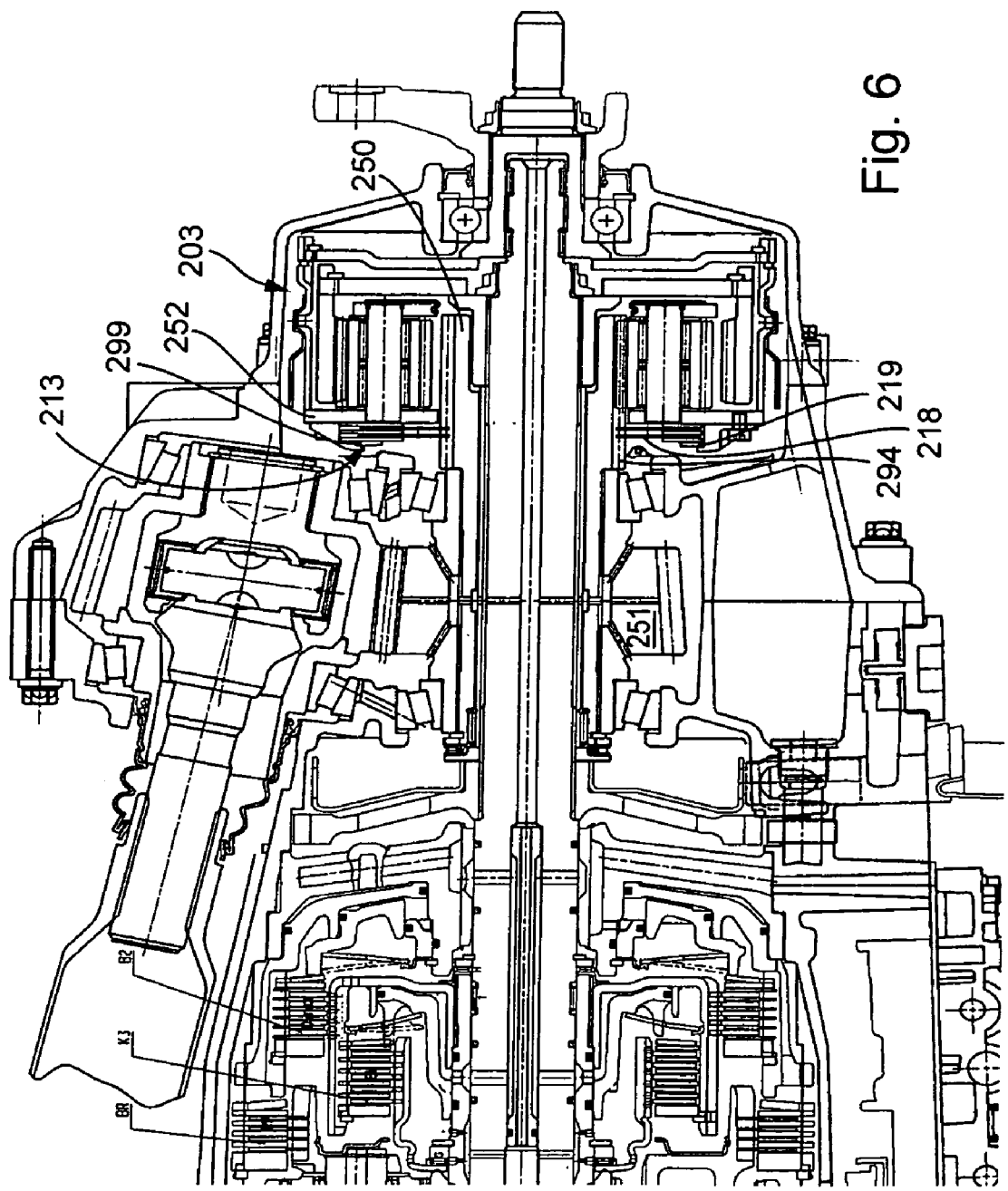
FIG. 6 shows a further exemplary configuration of an all-wheel drive train with a central differential lock which has a Bonanza effect element.

FIG. 6, in a further exemplary configuration, shows an all-wheel drive train having a central differential 203 which has a Bonanza effect element 213. A central differential lock is not provided in this exemplary configuration, although such a central differential lock could be provided in the same region as the Bonanza effect element 213 or alternatively in accordance with the installation according to FIG. 1. In the description below, components which are of essentially the same construction as the first exemplary configuration according to FIG. 1 are not explained in more detail. A sun gear 250 of the central differential 203 assumes three functions. The sun gear 250 receives from the central differential 203 a proportion of the drive torque for the front axle,
accommodates an internal tooth system of inner disks 218 of the Bonanza effect element 213, the teeth of this internal tooth system being in planar contact with a helical running tooth system 294 of the sun gear 250, and forms an axial stop for a drive pinion 251.

At a radially outer region, the inner disks 218 are pre-stressed axially against outer disks 219 by means of a pre-stressed Belleville spring 299. In this case, the inner disks 218 are rotationally fixed and axially displaceable relative to the sun gear 250, whereas the outer disks 219 are rotationally fixed and axially displaceable relative to the planet carrier 252 of the central differential 203. To this end, an external tooth system of the outer disks 219 engages in an internal tooth system of the planet carrier 252. This connection may be designed both as a spur tooth system and alternatively as a helical tooth system, the teeth of the outer disks 219 in the latter case being in planar contact with the helical internal tooth system of the planet carrier 252. Said pre-stressed Belleville spring 299 may also be designed according to EP 1 238 847 A2, so that a slip torque of the Bonanza effect element is temperature-dependent. In particular the inner disks 218 may be designed with recesses according to FIG. 5.

The transmission may be any desired transmission. For example, it may be:

an epicyclic automatic transmission,
an automated counter-shaft transmission,
a twin-clutch transmission,
a manual-shift transmission,
a continuously variable transmission, or
a toroidal transmission.

The disk according to the invention is not restricted to central differentials. The disks are also suitable, inter alia, for use in differential locks of a transverse differential of the rear axle and/or of the front axle. The disk according to the invention is also suitable for multi-disk clutches/brakes of automatic transmissions, such as, for example, epicyclic automatic transmissions or twin-clutch transmissions. The disk according to the invention may likewise be used in an epicyclic reversing set for the reverse gear, for example of an infinitely variable transmission.

However, the multi-disk clutch may also be designed as a Bonanza effect element for damping torque shock effects as a function of temperature, as is described in DE 101 11 257.2, which is not pre-published.

The cardan shaft may also be a lateral shaft without joints.

The rotary body need not necessarily be rotationally symmetrical, but rather may have any other desired forms, since, in a clutch, only the relative rotation between two clutch halves is necessary for the functioning. Inter alia, if one of the two clutch halves is a stationary component, such as, for example, a brake component fixed to a housing, a rotationally symmetrical form is not necessary.

The disk or the multi-disk clutch is not restricted to the intended use in motor vehicles. Use in other sectors, in particular in machine construction, is also conceivable. For example, use in transmissions or slip clutches of machine tools or production machinery is conceivable.

What is claimed is:

1. A multidisk clutch (13, 213) comprising a rotary body (22, 250) having splines with spline surfaces formed thereon so as to extend helically along said rotary body, a number of planar disks (19, 100) having side surfaces and central openings with inwardly extending teeth formed thereon, said disks being disposed on said rotary body in rotationally positive locking engagement with said rotary body (22, 250), each of said teeth having engagement face areas (30*a*, 30*b*) extending normal to the planar side surfaces of the teeth, said teeth being twisted out of the plane of the disks so as to extend in a direction normal to the surfaces of the helically extending splines wherein the face areas of the twisted teeth are in planar contact with the spline surfaces of the rotary body for the transmission of a torque between the rotary body and the disks (19, 100).

2. The multidisk clutch as claimed in claim 1, wherein, the clutch is installed as a differential lock in a central differential transmission for the distribution of a drive torque to rear and front axles of a motor vehicle, the disk (19, 100) connects two of three central differential parts (sun gear, planet carrier and ring gear) of the central differential transmission of the motor vehicle.

3. The multidisk clutch as claimed in claim 1, wherein the multi-disk clutch forms a torque shock damping structure (213).

4. The multi-disk clutch as claimed in claim 1, wherein a recess (104) is provided in the disks between adjacent teeth of the disk (100) at the root of the teeth in order to prevent stress cracking of the disks.

5. The multi-disk clutch as claimed in claim 4, wherein the teeth are twisted over an area which extends from the tip of a teeth up to the recess (104).

* * * * *